US010437553B2

(12) United States Patent
Bulis et al.

(10) Patent No.: US 10,437,553 B2
(45) Date of Patent: *Oct. 8, 2019

(54) SYSTEM LIMITS BASED ON KNOWN TRIGGERS

(71) Applicant: Sonos, Inc., Santa Barbara, CA (US)

(72) Inventors: Kirk Bulis, Los Angeles, CA (US); Jeremy Wessely, Los Angeles, CA (US); Jonathan Lang, Santa Barbara, CA (US); Romi Kadri, Cambridge, MA (US)

(73) Assignee: Sonos, Inc., Santa Barbara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/899,335

(22) Filed: Feb. 19, 2018

(65) Prior Publication Data
US 2018/0173492 A1    Jun. 21, 2018

Related U.S. Application Data

(63) Continuation of application No. 14/997,269, filed on Jan. 15, 2016, now Pat. No. 9,898,245.

(51) Int. Cl.
G06F 17/00 (2019.01)
G06F 3/16 (2006.01)
(Continued)

(52) U.S. Cl.
CPC ............ G06F 3/165 (2013.01); *H04L 12/282* (2013.01); *H04N 21/422* (2013.01);
(Continued)

(58) Field of Classification Search
CPC .............. H04L 12/282; H04L 12/2803; H04N 21/44218
See application file for complete search history.

(56) References Cited

U.S. PATENT DOCUMENTS 5,440,644 A    8/1995    Farinelli et al.
5,761,320 A    6/1998    Farinelli et al.
(Continued)

FOREIGN PATENT DOCUMENTS

EP    1389853 A1    2/2004
WO    200153994    7/2001
(Continued)

OTHER PUBLICATIONS

AudioTron Quick Start Guide, Version 1.0, Mar. 2001, 24 pages.
(Continued)

*Primary Examiner* — Thomas H Maung
(74) *Attorney, Agent, or Firm* — McDonnell Boehnen Hulbert & Berghoff LLP

(57) ABSTRACT

In an example implementation, a method may involve, while a first zone and a second zone of a media playback system are playing back respective media, receiving data indicating the occurrence of a first trigger condition. The method may also involve, based on the received data, modifying respective volume limits of the first zone and the second zone, wherein modifying the volume limit causes first volume levels that exceed the second limit to be reduced to respective second volume levels that are at or below the second limit. The method may also involve receiving data indicating the occurrence of a second trigger condition. The method may further involve, based on the received data, modifying the respective volume limits of the first zone and the second zone from the second limit to the first limit.

21 Claims, 6 Drawing Sheets

(51) Int. Cl.
*H04N 21/442* (2011.01)
*H04L 12/28* (2006.01)
*H04N 21/422* (2011.01)
*H04N 21/436* (2011.01)
*H04N 21/472* (2011.01)
*H04N 21/485* (2011.01)

(52) U.S. Cl.
CPC . *H04N 21/43615* (2013.01); *H04N 21/44218* (2013.01); *H04N 21/47217* (2013.01); *H04N 21/4852* (2013.01); *H04L 12/2803* (2013.01); *H04L 2012/2849* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington et al. |
| 8,483,853 | B1 | 7/2013 | Lambourne |
| 8,942,252 | B2 | 1/2015 | Balassanian et al. |
| 9,685,061 | B2 | 6/2017 | Shih et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0142944 | A1 | 6/2007 | Goldberg et al. |
| 2010/0112945 | A1 | 5/2010 | Hanif et al. |
| 2011/0293113 | A1 | 12/2011 | McCarthy |
| 2013/0016848 | A1 | 1/2013 | Warren et al. |
| 2013/0331970 | A1 | 12/2013 | Beckhardt et al. |
| 2013/0346859 | A1 | 12/2013 | Bates et al. |
| 2014/0201635 | A1 | 7/2014 | Kumar et al. |
| 2014/0324202 | A1 | 10/2014 | Coburn, IV et al. |
| 2015/0109112 | A1 | 4/2015 | Fadell et al. |
| 2015/0212788 | A1 | 7/2015 | Lang |
| 2015/0222987 | A1 | 8/2015 | Angel, Jr. et al. |

FOREIGN PATENT DOCUMENTS

| | | |
|---|---|---|
| WO | 2003093950 A2 | 11/2003 |
| WO | 2015066233 A2 | 5/2015 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Dec. 27, 2017, issued in connection with U.S. Appl. No. 14/871,621, filed Sep. 30, 2015, 16 pages.
International Searching Authority, International Search Report and Written Opinion dated Dec. 20, 2016, issued in connection with International Application No. PCT/US2016/053985, filed on Sep. 27, 2016, 20 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated May 16, 2017, issued in connection with U.S. Appl. No. 14/871,621, filed Sep. 30, 2015, 17 pages.
Non-Final Office Action dated May 16, 2017, issued in connection with U.S. Appl. No. 14/997,269, filed Jan. 15, 2016, 18 pages.
Notice of Allowance dated Apr. 5, 2018, issued in connection with U.S. Appl. No. 14/871,621, filed Sep. 30, 2015, 8 pages.
Notice of Allowance dated Oct. 5, 2017, issued in connection with U.S. Appl. No. 14/997,269, filed Jan. 15, 2016, 5 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

SYSTEM LIMITS BASED ON KNOWN TRIGGERS

CROSS-REFERENCE TO RELATED APPLICATIONS

This application is a continuation of U.S. application Ser. No. 14/997,269 titled "System Limits Based on Known Triggers," filed Jan. 15, 2016, and currently pending. The entire contents of U.S. application Ser. No. 14/997,269 are incorporated herein by reference.

FIELD OF THE DISCLOSURE

The disclosure is related to consumer goods and, more particularly, to methods, systems, products, features, services, and other elements directed to media playback or some aspect thereof.

BACKGROUND

Digital music has become readily available due in part to the development of consumer level technology that has allowed people to listen to digital music on personal audio devices and via systems that include connected speakers. With the increased availability of digital music has come an increasing number of systems and devices that allow a person to listen to his or her chosen digital music, as well as an increasing number of preferences and settings that can be set by a user based on his or her specific preferences, to allow the user to have the best possible listening experience.

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
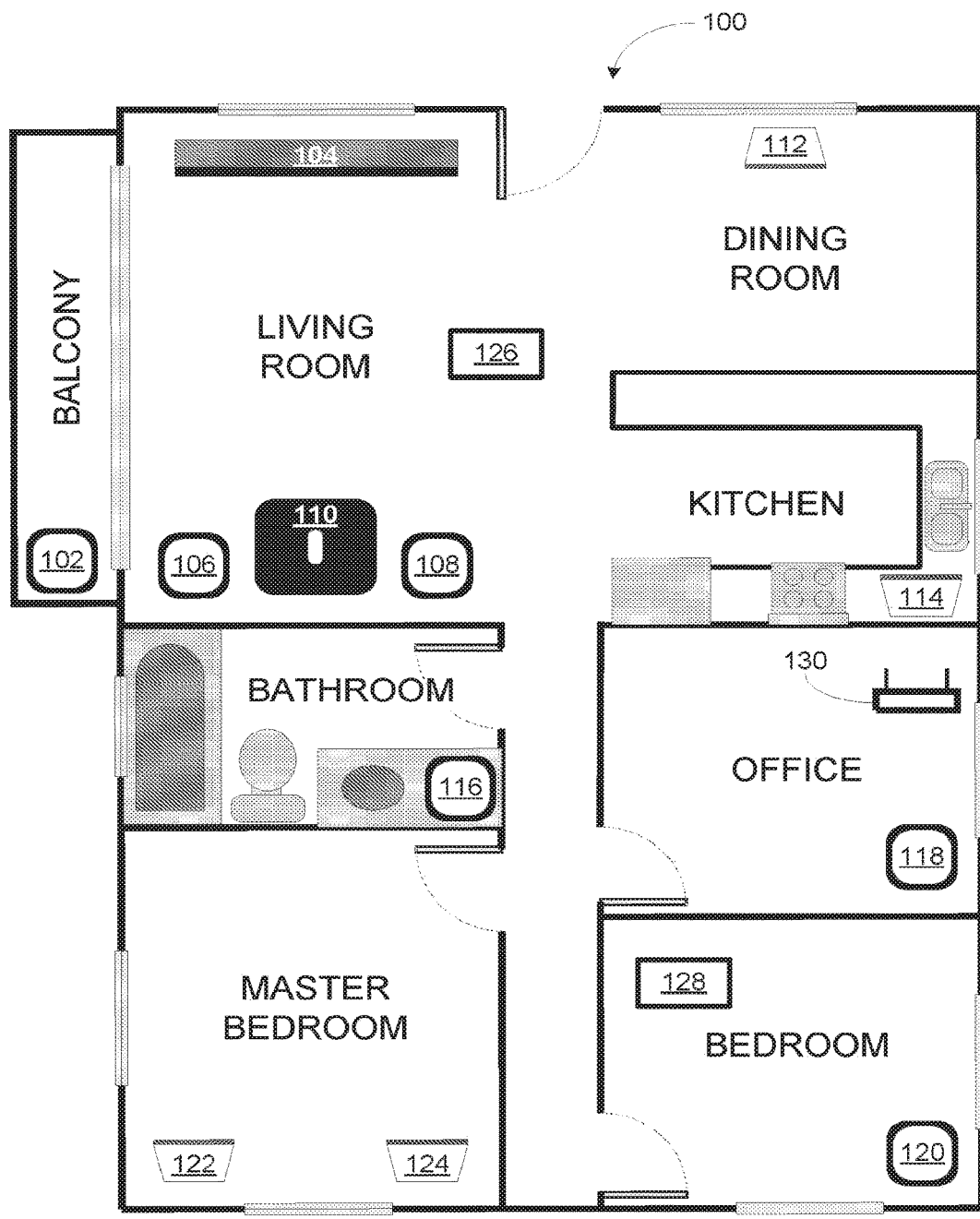
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Media playback systems have become increasingly popular as they are included in more and more homes, hotels, motels, stores, businesses, and other like environments. In some of these environments, it may be beneficial to control one or more media playback systems based on one or more external triggers.

In one example, for instance, a retail store may include multiple media playback systems used in close proximity, such as in household testing rooms where consumers can experience media playback systems in the store. Consumers can test media and change preferences of the media playback system to gain a more complete understanding of how the media playback system operates before purchasing the system. One consumer's experience may be negatively impacted if sound, visuals, or other output from a nearby household testing room leaks into his or her testing room. Further, consumers, workers, or other persons in the retail store might not wish to hear or experience the media playback system included in the household testing rooms.

As such, example embodiments disclosed herein may help avoid problems of sound, visual, or other output leakage from one household testing room into another, or into the retail store in general. When an external trigger condition is met, such as a door to a testing room opening, a system limit such as the volume limit for the media playback system included in that testing room may be reduced.

By way of example, a consumer may play music on a media playback system included in a household testing room with the door closed. When the door is closed, the volume system limit may be 100%. However, when the door is opened, the volume system limit of the media playback system may be reduced to 50%. As a result, if the consumer was listening to music at a volume level of 75% with the door closed, the volume will be reduced when the door is opened. However, if the consumer was listening to music at a volume level of 25% with the door closed, the volume may remain unchanged when the door is opened. In this manner, the media playback system can operate at the consumer's preferred level in circumstances where the sound leakage does not have a large impact on other testing rooms or consumers.

The example described above is merely one example embodiment, and other implementations and trigger conditions may be used as well. For example, a trigger condition may include an alarm or siren being activated. When an alarm or siren sound occurs, the volume system limit may be reduced to 0% or muted.

Further, other system limits may be modified in addition to or instead of the volume, such as an output power, output equalization level, or other characteristic.

In one aspect, an example control system according to the present disclosure may include one or more processors, and a tangible computer-readable memory having instructions stored thereon that, when executed by the one or more processors, cause the control system to perform a method which includes (i) while a first zone and a second zone of a media playback system are playing back respective media, receiving data indicating that an external sensor detected occurrence of a first trigger condition, wherein the first zone comprises a first playback device and the second zone comprises a second playback device, and wherein the first and second playback devices are set to respective first volume levels while playing back the respective media, (ii) based on receiving the data indicating that the external sensor detected occurrence of the first trigger condition, modifying respective volume limits of the first zone and the second zone from a first limit to a second limit that corresponds to the first trigger condition, wherein modifying the volume limit causes first volume levels that exceed the second limit to be reduced to respective second volume levels that are at or below the second limit, (iii) receiving data indicating that the external sensor detected occurrence of a second trigger condition, and (iv) based on receiving the data indicating that the external sensor detected occurrence of the second trigger condition, modifying the respective volume limits of the first zone and the second zone from the second limit to the first limit.

In another aspect, an example non-transitory computer-readable medium is provided. The non-transitory computer-readable medium has stored thereon instructions that, when executed by one or more processors, cause a control system to perform a method. The method includes (i) while a first zone and a second zone of a media playback system are playing back respective media, receiving data indicating that an external sensor detected occurrence of a first trigger condition, wherein the first zone comprises a first playback device and the second zone comprises a second playback device, and wherein the first and second playback devices are set to respective first system setting levels while playing back the respective media, (ii) based on receiving the data indicating that an external sensor detected occurrence of the first trigger condition, modifying a system limit of the media playback system from a first limit to a second limit that corresponds to the first trigger condition, wherein the first system setting levels correspond to the system limit, and wherein modifying the system limit causes respective first system setting levels that exceed the second limit to be reduced to respective second system setting levels that are at or below the second limit, (iii) receiving data indicating that the external sensor detected occurrence of a second trigger condition, and (iv) based on receiving the data indicating that the external sensor detected occurrence of the second trigger condition, modifying the system limit of the media playback system from the second limit to the first limit, wherein modifying the system limit of the media playback system modifies respective limits of the first zone and the second zone.

In yet another aspect, an example method may include (i) while a first zone and a second zone of a media playback system are playing back respective media, receiving, via a control system, data indicating that an external sensor detected occurrence of a first trigger condition, wherein the first zone comprises a first playback device and the second zone comprises a second playback device, and wherein the first and second playback devices are set to respective first respective first system setting levels while playing back the respective media, (ii) based on receiving the data indicating that the first trigger condition occurred, modifying a system limit of the media playback system from a first limit to a second limit that corresponds to the first trigger condition, wherein the first system setting levels correspond to the system limit, and wherein modifying the system limit causes respective first system setting levels that exceed the second limit to be reduced to respective second system setting level that are at or below the second limit, (iii) receiving data indicating that the external sensor detected occurrence of a second trigger condition, and (iv) based on receiving the data indicating that the second trigger condition occurred, modifying the system limit of the media playback system from the second limit to the first limit, wherein modifying the system limit of the media playback system modifies respective limits of the first zone and the second zone.

It will be understood by one of ordinary skill in the art that this disclosure includes numerous other embodiments. It will be understood by one of ordinary skill in the art that this disclosure includes numerous other embodiments. While some examples described herein may refer to functions performed by given actors such as "users," "consumers," and/or other entities, it should be understood that this description is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a hotel, motel, household, rental property, commercial setting like a restaurant, business, mall or airport, a vehicle like a sports utility vehicle (SUV), bus or car, a ship or boat, an airplane, and so on.

a. Example Playback Devices

Figure 2:
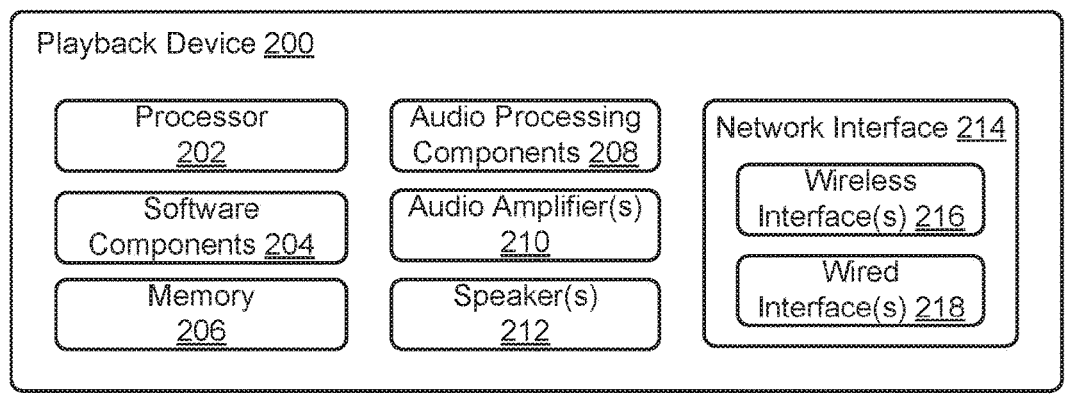
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions or operations. In one example, the functions or operations may involve the playback device 200 retrieving audio data from an audio source or another playback device. In another example, the functions or operations may involve the playback device 200 sending audio data to another device or playback device on a network. In yet another example, the functions or operations may involve pairing of the playback device 200 with one or more playback devices to create a multi-channel audio environment.

Certain functions or operations may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as system settings and/or limits, one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
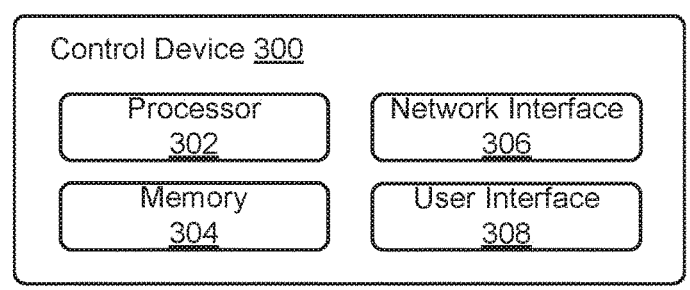
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™)

The processor 302 may be configured to perform functions or operations relevant to facilitating user access, control, and configuration of the media playback system 100. The memory 304 may be configured to store instructions executable by the processor 302 to perform those functions or operations. The memory 304 may also be configured to store the media playback system controller application software and other data associated with the media playback system 100 and the user. In some examples, the memory 304 may be configured to store system levels and system limits for one or more media playback devices.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100, and/or one or more external sensors. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device. In another example, data and information may be communicated between control device 300 and an external sensor via network interface 306. For instance, an external sensor may detect a trigger condition has been met (e.g., a door has opened or an alarm has been activated), and may communicate that the condition has been met to control device 300.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
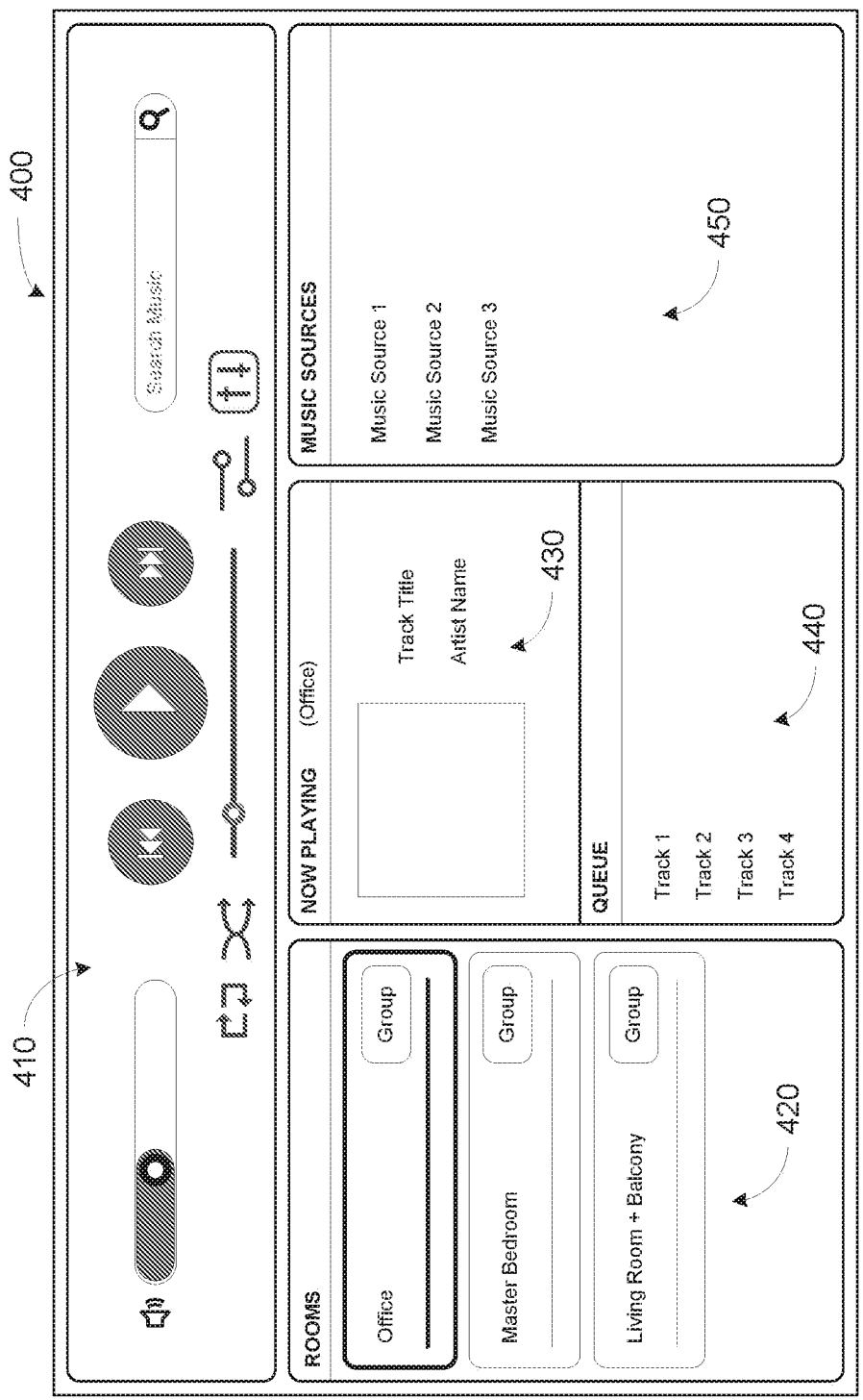
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group.

In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Application of Media Playback System Limits

Figure 5:
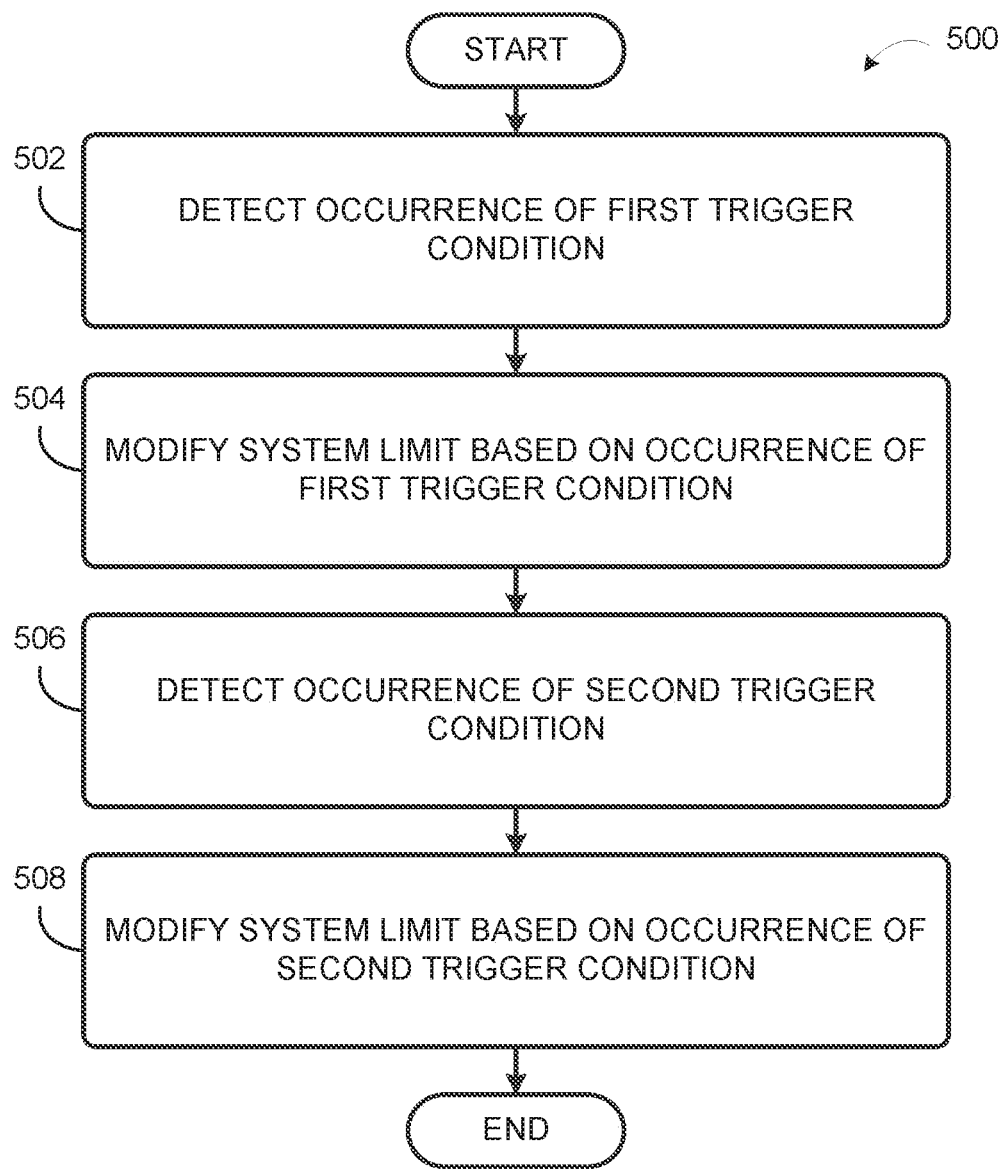
FIG. 5 shows an example flow diagram of an implementation of the present disclosure

FIG. 5 shows a flow diagram of example implementation 500 for setting media playback system limits based on known triggers. Implementation 500 presents example techniques that can be implemented within an operating environment involving, for example, the media playback system 100 of FIG. 1, one or more of the playback device 200 of FIG. 2, and one or more of the control device 300 of FIG. 3. In one example, implementation 500 may be performed in whole or in part by a control system in communication with a media playback system. Alternatively, implementation 500 may be performed by one or more of playback device 200, control device 300, and one or more internal or external sensors.

Implementation 500 may include one or more operations, functions, or actions as illustrated by one or more of blocks 502-508. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for implementation 500 and other processes and methods disclosed herein, each block may represent circuitry that is wired to perform the specific logical functions in the process.

a. Detect Occurrence of First Trigger Condition

At block 502, implementation 500 may include detecting the occurrence of a first trigger condition. The trigger condition may be any event that causes a sensor to detect its occurrence. In particular, the trigger condition may relate to events during which it may be beneficial for sound or other output of a media playback system to be reduced.

A control system may detect the occurrence of the trigger condition by way of a sensor. The control system may be implemented in various devices, and or as a network of the various devices. In some examples, the control system is implemented in one or more devices of a media playback system (e.g., a playback device, such as playback device 200, or a control device, such as control device 300). In other examples, the control system is implemented in a computing system that is communicatively coupled to a media playback system (e.g., media playback system 100).

As noted above, the control system may detect the occurrence of a trigger condition by way of a physical sensor. Such a sensor may be internal or external to the control system. Several examples of an internal sensor include a microphone, switch, or button that is a component or part of a playback device or control device of the media playback system. External sensors may include a proximity sensor, motion sensor, light sensor, door positioning sensor, switch, button, microphone, temperature sensor, and/or a pressure sensor, among other examples. These external sensors may be separate from one or more playback devices or control devices of the media playback system, and may be communicatively coupled with the control system via a network interface or other communication interface.

Detecting the trigger condition may involve detecting various physical changes in a listening environment. Some example trigger conditions may relate to listeners in a listening area. For instance, a control system may detect that a door has opened and/or closed, which may indicate that one or more people have entered or exited a listening area (e.g., a testing room in a retail space). Alternatively, a proximity sensor may be used detect movement near a media playback system, which may also indicate that one or more people have entered a listening area. Other example trigger conditions may relate to emergency conditions. During an emergency, adjusting the operation of a media playback system may be beneficial. As such, in some examples, the control system may detect that an emergency condition has occurred, perhaps by detecting the sounding of an alarm (e.g., fire alarm, smoke alarm, carbon monoxide, etc. . . . ) by way of a microphone. In one implementation, the control system may be physically connected or hardwired to an alarm or other emergency sensor, which may detect when an emergency condition has occurred. The control system may then detect that the emergency condition has occurred based on input from the alarm or emergency sensor. Other trigger conditions are possible as well, such as a window opening, a power outage or disruption, a voice command, or other physical conditions that can be detected by a sensor, such as the sensors described above. In some examples, the trigger condition indicates that it may be beneficial to modify one or more system limits of the media playback system, such as lowering a system volume limit for example.

Figure 6:
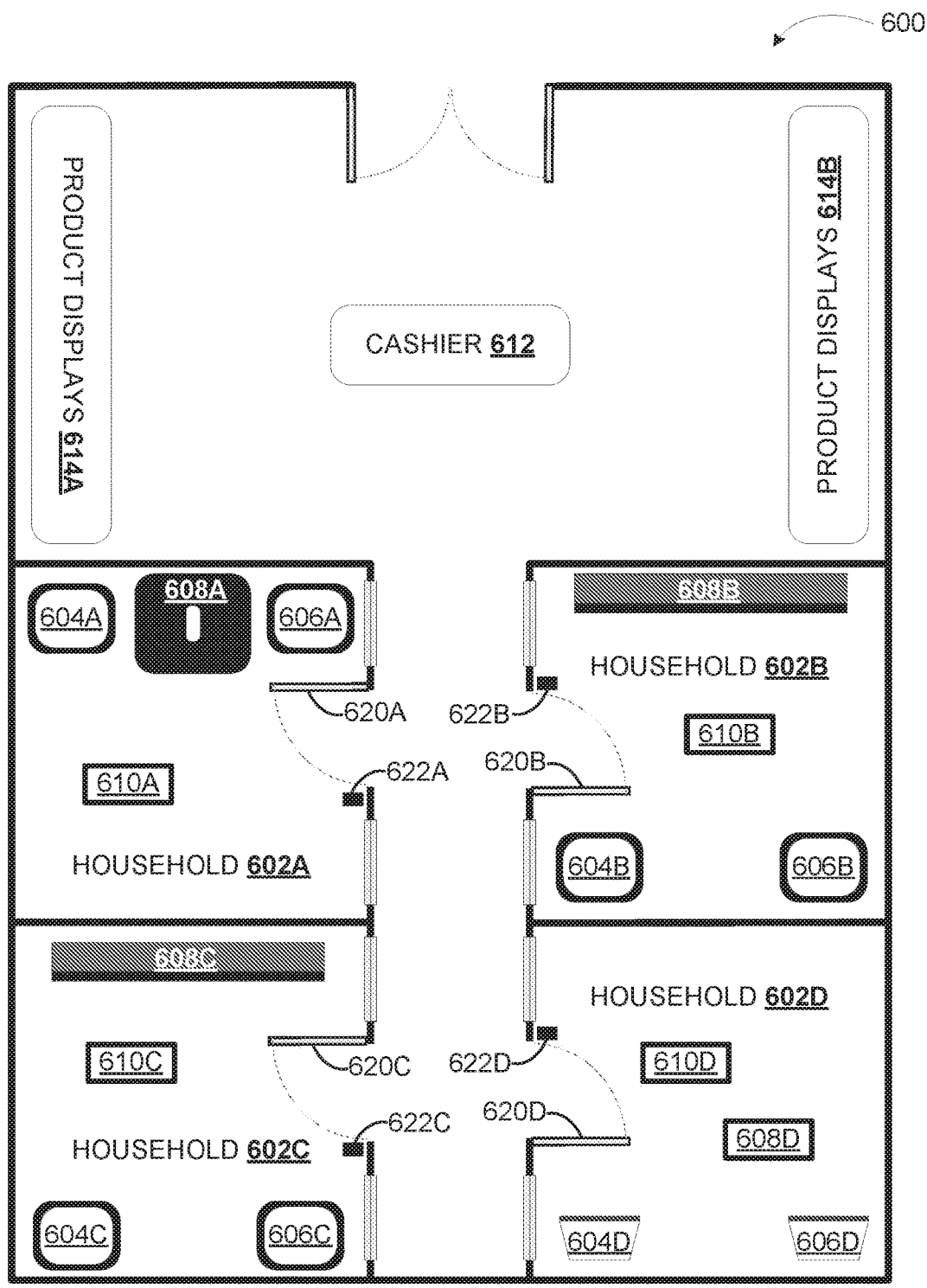
FIG. 6 shows an example retail space in which certain embodiments may be practiced.

In one example, implementation 500 may be used in a retail environment that includes one or more household testing rooms. To illustrate, FIG. 6 depicts an example retail space 600 that includes a cashier 612, product displays 614A and 614B, and example household testing rooms 602A, 602B, 602C, and 602D that include respective media playback systems. Each household testing room may include one or more playback devices (e.g., one or more instances of playback device 200) and one or more control devices (e.g., one or more instances of control device 300). Each household testing room 602A, 602B, 602C, and 602D may be accessed by way of a respective door 620A, 620B, 620C, and 620D. Sensors 622A, 622B, 622C, and 622D may be arranged to detect opening and/or closing of doors 620A-D, respectively.

As shown, household 602A includes playback devices 604A, 606A, and 608A, as well as control device 610A. Similarly, households 602B, 602C, and 602D include playback devices and a control device(s). In particular, household 602B includes playback devices 604B, 606B, and 608B, as well as control device 610B. Household 602C includes playback devices 604C, 606C, and 608C, as well as control device 610C. And, household 602D includes playback devices 604D and 606D, and also control devices 608D and 610D.

A consumer may enter one of the households to experience one of the media playback systems. In other words, each household may operate as a demo space or testing area for a respective media playback system. When a consumer enters or leaves a testing room, or a door 620A, 620B, 620C, or 620D opens or closes, the sensors 622A, 622B, 622C, and/or 622D may detect that the door has opened or closed. As such, the trigger condition may be the opening or closing of a door to a listening area, which may be detected by way of sensors.

Figure 7A:
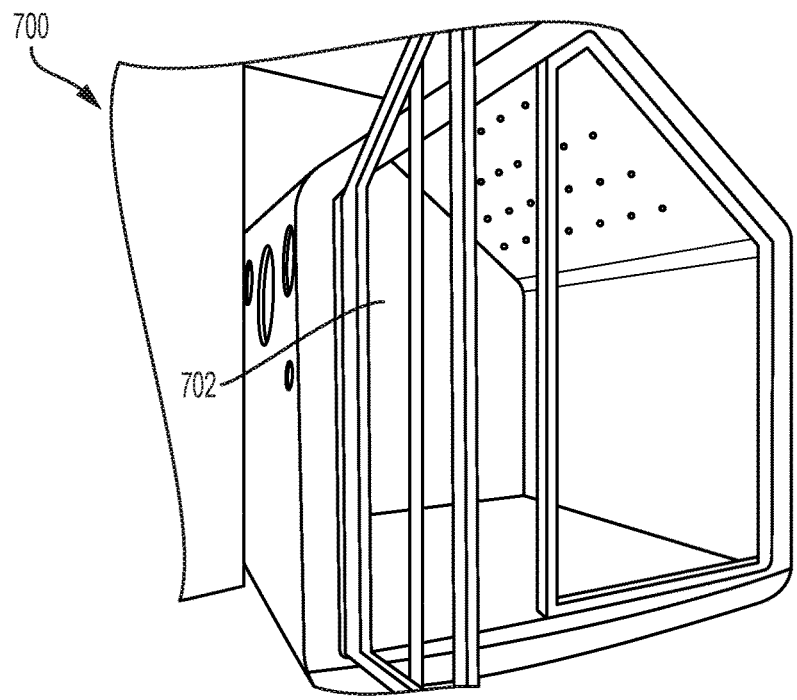
FIGS. 7A and 7B show an example implementation of a household testing room in an example retail space, having an open and closed door respectively.
Figure 7B:
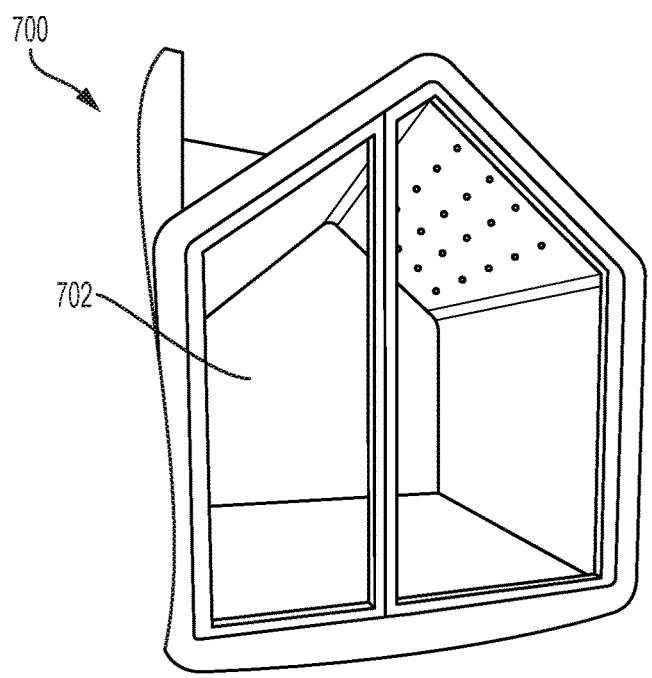

FIGS. 7A and 7B illustrate an example implementation of a household testing room 700 in an example retail space, having an open and closed door respectively. In particular, FIG. 7A depicts the testing room 700 with door 702 open, so as to allow entry by listeners to the testing room 700. FIG. 7B depicts the testing room 700 with door 702 closed, as may occur after the listeners have entered to listen to a media playback system inside testing room 700. A sensor may be arranged to detect the opening and/or closing of door 702 so that a control system can use the sensor to detect certain trigger conditions with respect to the door.

In some examples, detecting the occurrence of the trigger condition may involve detecting that a threshold period of time has elapsed. For instance, in the example embodiment described above, a control system might not determine that the trigger condition has occurred until the trigger condition (e.g., the door opening) has been present for a threshold period of time (e.g., one to five seconds). Such a delay may aid in determining that the physical change indicated by the trigger condition has actually occurred (e.g., that a door has actually opened, rather than that the door having been bumped or opened only briefly). Other thresholds may be used, and may depend on the type of sensor used. For instance, a pressure sensor may have a threshold value that must be reached before determining that the trigger condition has occurred. Likewise, a door positioning sensor may have a threshold position that must be detected (e.g., 50% open) before the sensor detects that the trigger condition has occurred.

As noted above, in some examples, the trigger condition may include an alarm sounding or being activated, such as a smoke alarm, fire alarm, or carbon monoxide alarm, for example. In this case, the sensor may be a microphone or other sound based sensor that can detect that the alarm has sounded, or a sensor physically connected or hardwired to the alarm which may detect that a trigger condition has occurred.

To facilitate detection of a trigger condition, a control system may receive sensor data from a sensor. The data transmitted may include a command, text, bit stream, floating number, or an on/off state or other state of the sensor. In some cases, such sensor data may include a data stream of sensor levels (e.g., data indicating raw values), which the control system may process to determine whether the trigger condition occurred. In other examples, the sensor data may include a message indicating that the trigger condition has occurred, perhaps with data processing occurring at the sensor or otherwise before being transmitted to the control system. The sensor data may be transmitted from the sensor to a control device of the media playback system, a playback device, several control devices or playback devices, or any combination thereof. The sensor may be in communication with any or all of the devices of the media playback system via a network interface or communication interface of any of the devices of the media playback system.

In some examples, the data may be sent to a first device of the media playback system, such as a control device or playback device, either of which may also include or be a part of the control system of the media playback system. In other examples, the data may be sent to multiple devices of the media playback system. The sensor may address the sensor data to a particular device (or devices) based on registration or other association between the sensor and those devices (e.g., as between sensor 622A and devices 604A, 606A, 608A, and 610A of household 602A. Alternatively, one or more devices may respond to a message from the sensor, and the sensor may address the sensor data to the first device that responds, or to the device having a particular networking address (e.g., the lowest networking address (e.g., IP, MAC)), or other criteria. In a particular embodiment, sensor data may be transmitted according to a communication protocol used by a media playback system, such as a modified spanning tree protocol for example. Further, in some examples, the sensor data may be received by the first device and subsequently transmitted to other devices of the media playback system.

b. Modify System Limit Based on Occurrence of First Trigger Condition

The media playback system may receive the sensor data from the sensor, and responsively perform one or more functions or operations. For example, the media playback system may store a current state of the media playback system in response to receiving the data indicating that the sensor has detected the occurrence of the trigger condition. In other examples, an initial state of the media playback system prior to the occurrence of the first trigger condition may be stored. Further, the current state or initial state of one or more devices of the media playback system (as opposed to the entire media playback system) may be stored as well.

In some examples, the current or initial state may be stored in a memory of one or more devices of the media playback system. For instance, the current or initial state may include particular settings for a plurality of playback devices that are part of a media playback system, including various system settings and system limits such as volume levels, equalization settings, power consumption and output, groupings, and various system limits. The particular settings for each playback device may be stored respectively in a memory of each playback device itself, may be stored on multiple devices, or may all be stored on the same device or devices. For example, a media playback system with two playback devices may store the particular settings of the first playback device in the memory of the first playback device, while storing the particular settings of the second playback device in the memory of the second playback device. As a result, storage of the system settings and system limits of the current state may be distributed across both playback devices of the media playback system. In other examples, the current or initial state may be stored by one device in the media playback system. In other examples, each device in the media playback system may store all or part of the current or initial state. In still other examples, the current or initial state may be stored by a device or system connected to the media playback system through one or more communication interfaces, such as storage on a server or cloud based system or device.

At block 504, implementation 500 may include modifying a system limit based on the occurrence of the first trigger condition. For example, based on detecting the opening of door 620A by way of sensor 622A, a control system associated with household 602A may modify a system limit of one or more devices of household 602A (e.g., playback device 604A, 606A, and/or 608B).

Within examples, the system limit may govern different groupings of devices. For instance, the system limit may govern the media playback system as a whole, such as a system volume limit, output power limit, or output intensity limit, among other examples. Alternatively the system limit may govern an individual device or set of devices of the media playback system. Yet further, the system limit may include respective system limits that govern devices or sets of devices.

In some cases, the system limit may reflect a maximum value to which the media playback system can be set. As such, the system limit differs from the actual system level, which may be the value that is currently set. For example, a media playback system may have its volume level set to 50% of maximum volume, and at the same time have its volume system limit set to 100%. In this case, the media playback system will continue to increase volume as the volume is turned up to 100%. Alternatively, if the volume system limit is set to 50%, the media playback system may prevent the volume level from being increased above 50%.

In some examples, modifying the system limit may include reducing the system limit from a first level to a second level. For instance, where a media playback system is being used in a household testing room, the volume system limit may be reduced from a first level (e.g., 90%) to a second level (e.g., 30%) when the control system detects that a trigger condition has occurred (e.g., that a door to the room is opened).

In some implementations, when the system limits are modified, respective levels associated with the system limits are gradually modified over a period of time. For instance, where a system volume limit is reduced from a first level to a second level, the volume level(s) may be gradually reduced over a period of time (e.g., 1-5 seconds) to a volume level that is at or below the second level. Other durations may be used as well. The duration over which the system limit is modified may depend on the trigger condition. For instance, where the trigger condition is an alarm sounding, an immediate reduction of the system volume limit may occur (i.e., muting the system). Alternatively, the system volume limit may be reduced gradually in an environment such as a household testing room, or based on a time of day (e.g., after 10:00 pm the reduction is gradual, but before 10:00 pm the reduction is immediate).

Within examples, the extent of limit modification may depend on the type of sensor or data. For instance, the system limit may be proportionally reduced based on the trigger condition. In an example where the trigger condition is a door opening, the system limit might be reduced by 5% when the door is slightly open, and reduced by a greater amount when the door is opened further. In this manner, the extent of modification may be based on the data received from the sensor.

As noted above, in some cases, the actual system level may be modified also. For example, where the system volume limit is reduced by half from 100% to 50%, the actual volume level may be reduced to a level that is at or below 50%. In one example, the change in actual system level may be proportionate to the change in system limit (e.g., reduction by half for both the system limit and the actual system level). In other examples the change in actual system level may be disproportionate to the change in system limit, for instance reducing the system limit from 100% to 50%, while reducing the actual system level from 75% to 50%.

The modification to the system limit can apply to the media playback system as a whole, to each device individually, or to a combination of devices in the media playback system. Further, each device in the media playback system may have a different modification to the system limit specific to the respective device. By way of example, a media playback system that includes two playback devices may have a system volume limit for both playback devices reduced from 100% to 50%. In another case, the same media playback system may have a system volume limit for the first playback device reduced from 100% to 50%, while the second playback device has its system volume limit reduced from 100% to 25%.

In some examples, the system limit may be modified individually for each device in the media playback system based on the type of device. For instance, where a media playback system includes a subwoofer and a mid-high range speaker, the system limit for the subwoofer may be modified differently than the mid-high range speaker. The difference in modification of the system limits for two devices may be based on the type of device, the output power, output frequency range, power consumption, or other characteristic of the respective devices.

The system limit may also be modified such that a total output level is reduced to another value (i.e. sound pressure level), or such that the output sound-pressure level for each device in the media playback system is reduced to approximately the same level. For instance, a media playback system having a first playback device and a second playback device, where the second playback device includes a higher-powered audio stage than the first playback device, may have the second playback device system limit reduced by a greater amount than the first playback device. As a result, both the first and second playback devices may have system limits reduced such that the output sound pressure level for each is approximately the same.

Further, in some examples the system limit modification may depend on the arrangement of playback devices in the media playback system, both physically and based on groupings of devices into zones, zone groups, bonded zones, or other arrangements. For instance, a playback device physically located closer to a door of a room containing the media playback system may have its system volume limit reduced by a greater amount than a playback device located toward a wall opposite the door. In other cases, playback devices in a given zone may have system limits modified such that the system limit for the zone as a whole is reduced to a specified level, the output sound pressure level for each device in the zone is limited to a specified level, the system level for the zone as a whole is approximately equal to the system limit of one or more other zones, or for another reason.

Similarly, playback devices in a bonded zone or zone group may have system limits modified such that the bonded zone or zone group output sound pressure level is approximately equal to that of one or more other bonded zones or zone groups, or such that each device in the bonded zone (or zone in the zone group) has approximately the same output sound pressure level as the other device or devices (or zones).

Further, a media playback system that includes multiple playback devices arranged in zones, bonded zones, and/or zone groups may have the devices, zones, bonded zones, and/or zone groups' system limits modified such that the output sound pressure level of the arranged playback devices are approximately the same. For instance, a bonded zone having two playback devices may have a system limit reduced to 25% while a single playback device in the same media playback system may be reduced to 50%.

It should be noted that the examples provided above generally describe instances where devices or groups of devices are modified such that the output sound pressure level is approximately equal to another device or group. However, these are merely examples, and the devices or groups may have system limits modified such that some are greater than others or for another reason.

c. Detect Occurrence of Second Trigger Condition

At block 506, implementation 500 may involve detecting the occurrence of a second trigger condition. The second trigger condition may include any trigger condition listed or described above with reference to the first trigger condition. In particular examples, the second trigger condition may include the opposite or reverse of the first trigger condition, such as the closing of a door or an alarm turning off. In another example, the second trigger condition may be that a threshold amount of time has elapsed from the time that the first trigger condition occurred, such as one minute, ten minutes, or some other duration. The second trigger condition may indicate that the modified system limit can be reverted back to, or modified a second time.

In some examples, the detection of the second trigger condition may be carried out by the same sensor that detected the first trigger condition. For instance, a sensor configured to detect that a door has opened (i.e., the first trigger condition) may also be configured to detect that the door has been closed (i.e., the second trigger condition). In other examples, detecting that the first trigger condition and second trigger condition have occurred may be carried out by different sensors.

After detecting the occurrence of the second trigger condition, the sensor may transmit data to one or more devices of the media playback system.

d. Modify System Limit Based on Occurrence of Second Trigger Condition

At block 508, implementation 500 may involve modifying a system limit based on the occurrence of the second trigger condition. In some examples, this modification may involve reverting the system limit modified in response to the occurrence of the first trigger condition back to its original value. In other examples, this modification may involve further reducing the system limit, or changing the system limit to a value other than its original value.

In some examples, particularly where the modification involves reverting the system limit back to its original value, the system limit may be modified by retrieving a system limit value from a current state stored by the media playback system in response to the occurrence of the first trigger condition. The system limit may then be set to the retrieved value. In other examples, the system limit may be modified by further reducing the system limit, or increasing the system limit to a predetermined value (i.e., 100%). In some examples, the second trigger condition may act as a confirmation of the first trigger condition. For instance, in a household testing room environment, the first trigger condition may be that a door to the room has opened. In response, the system volume limit may be reduced from a first level to a second level (e.g., 100% to 50%). The second trigger condition may be that a given duration has elapsed since the first trigger condition has occurred, such as five minutes passing without the door closing. In response, the system volume limit may be further reduced (e.g., from 50% to 25%). Other examples and modifications described above are possible as well.

Further, the actual system values may be modified in response to the occurrence of the second trigger condition as well. For instance, where the system volume limit is increased or reverted back to its prior level, the actual volume level may be increased as well, perhaps to the level before first trigger condition caused modification.

In some examples, implementation 500 may also include providing an indication of the change to the system limit. The indication may indicate that a system limit modification is about to occur, is currently occurring, or will occur in the future. The indication may also include a sound such as a tone or beep that indicates the system limits are being changed. The indication may also or alternatively include a visual component, such as a flashing or solid light emitting diode (LED), or a message on a display such as the controller interface of FIG. 4 for example.

IV. Conclusion

The descriptions above disclose, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves modifying system limits based on the occurrence of a trigger condition. In one aspect, a control system is provided. The control system may include one or more processors, and a tangible computer-readable memory having instructions stored thereon that, when executed by the one or more processors, cause the control system to perform a method which includes (i) while a first zone and a second zone of a media playback system are playing back respective media, receiving data indicating that an external sensor detected occurrence of a first trigger condition, wherein the first zone comprises a first playback device and the second zone comprises a second playback device, and wherein the first and second playback devices are set to respective first volume levels while playing back the respective media, (ii) based on receiving the data indicating that the external sensor detected occurrence of the first trigger condition, modifying respective volume limits of the first zone and the second zone from a first limit to a second limit that corresponds to the first trigger condition, wherein modifying the volume limit causes first volume levels that exceed the second limit to be reduced to respective second volume levels that are at or below the second limit, (iii) receiving data indicating that the external sensor detected occurrence of a second trigger condition, and (iv) based on receiving the data indicating that the external sensor detected occurrence of the second trigger condition, modifying the respective volume limits of the first zone and the second zone from the second limit to the first limit.

In another aspect, an example non-transitory computer-readable medium is provided. The non-transitory computer-readable medium has stored thereon instructions that, when executed by one or more processors, cause a control system to perform a method. The method includes (i) while a first zone and a second zone of a media playback system are playing back respective media, receiving data indicating that an external sensor detected occurrence of a first trigger condition, wherein the first zone comprises a first playback device and the second zone comprises a second playback device, and wherein the first and second playback devices are set to respective first system setting levels while playing back the respective media, (ii) based on receiving the data indicating that an external sensor detected occurrence of the first trigger condition, modifying a system limit of the media playback system from a first limit to a second limit that corresponds to the first trigger condition, wherein the first system setting levels correspond to the system limit, and wherein modifying the system limit causes respective first system setting levels that exceed the second limit to be reduced to respective second system setting levels that are at or below the second limit, (iii) receiving data indicating that the external sensor detected occurrence of a second trigger condition, and (iv) based on receiving the data indicating that the external sensor detected occurrence of the second trigger condition, modifying the system limit of the media playback system from the second limit to the first limit, wherein modifying the system limit of the media playback system modifies respective limits of the first zone and the second zone.

In yet another aspect, an example method may include (i) while a first zone and a second zone of a media playback system are playing back respective media, receiving, via a control system, data indicating that an external sensor detected occurrence of a first trigger condition, wherein the first zone comprises a first playback device and the second zone comprises a second playback device, and wherein the first and second playback devices are set to respective first respective first system setting levels while playing back the respective media, (ii) based on receiving the data indicating that the first trigger condition occurred, modifying a system limit of the media playback system from a first limit to a second limit that corresponds to the first trigger condition, wherein the first system setting levels correspond to the system limit, and wherein modifying the system limit causes respective first system setting levels that exceed the second limit to be reduced to respective second system setting level that are at or below the second limit, (iii) receiving data indicating that the external sensor detected occurrence of a second trigger condition, and (iv) based on receiving the data indicating that the second trigger condition occurred, modifying the system limit of the media playback system from the second limit to the first limit, wherein modifying the system limit of the media playback system modifies respective limits of the first zone and the second zone.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A system comprising:
one or more processors; and
a tangible, non-transitory computer-readable memory storing instructions that, when executed by the one or more processors, cause the system to perform operations comprising:
while a first zone and a second zone of a media playback system are playing back respective media, receiving first data indicating an occurrence of a first trigger condition, wherein the first zone comprises a first playback device and the second zone comprises a second playback device, wherein the first and second playback devices are set to respective first and second volume levels while playing back the respective media, and wherein the first and second playback devices have corresponding first and second volume limits;
based on receiving the first data, modifying the first volume limit by a first amount that corresponds to the first trigger condition, and modifying the second volume limit by a second amount that corresponds to the first trigger condition, wherein the second amount is different than the first amount, wherein modifying the first volume limit causes the first volume levels that exceed the modified first volume limit to be reduced to adjusted first volume levels at or below the modified first volume limit, and wherein modifying the second volume limit causes the second volume levels that exceed the modified second volume limit to be reduced to adjusted second volume levels at or below the modified second volume limit; and
reverting the modified first and second volume limits to the respective first and second volume limits in response to an occurrence of a second trigger condition.

2. The system of claim 1, further comprising a microphone configured to receive voice input.

3. The system of claim 2, wherein the first trigger condition comprises a voice command detected via the microphone.

4. The system of claim 2, wherein the microphone is disposed within the first zone of the media playback system.

5. The system of claim 4, wherein the microphone is disposed in the first playback device.

6. The system of claim 1, wherein the second trigger condition comprises a threshold period of time after the occurrence of the first trigger condition.

7. The system of claim 1, wherein the received first data comprises an indication of a voice command.

8. The system of claim 1, wherein the system is enclosed in a housing of the first playback device, and wherein receiving the first data further comprises receiving, via a network interface of the first playback device, a message indicating that a sensor detected occurrence of the first trigger condition.

9. The system of claim 1, wherein causing the first volume levels that exceed the modified first volume limit to be reduced to first volume levels that are at or below the modified first volume limit comprises gradually reducing the first volume levels to the adjusted first volume levels over a period of time greater than or equal to one second, and less than or equal to five seconds.

10. The system of claim 1, wherein the first zone and the second zone are joined into a zone group that is configured to play back media in synchrony, and wherein modifying the first and second volume limits to the respective modified first and second volume limits comprises modifying zone volume limits of the first zone and the second zone to respective modified zone volume limits based on (i) a number of playback devices in the zone group, and (ii) respective types of playback devices in the zone group.

11. The system of claim 1, wherein the second zone comprises a bonded zone that further includes a third playback device, wherein the second playback device and the third playback device of the bonded zone are configured to play respective channels of media, and wherein modifying the second volume limit further comprises modifying the second volume limit based on a configuration of playback devices in the bonded zone.

12. A tangible, non-transitory computer-readable medium storing instructions that, when executed by one or more processors, cause a system to perform operations comprising:
while a first zone and a second zone of a media playback system are playing back respective media, receiving first data indicating an occurrence of a first trigger condition, wherein the first zone comprises a first playback device and the second zone comprises a second playback device, wherein the first and second playback devices are set to respective first and second volume levels while playing back the respective media, and wherein the first and second playback devices have corresponding first and second volume limits;
based on receiving the first data, modifying the first volume limit by a first amount that corresponds to the first trigger condition, and modifying the second volume limit by a second amount that corresponds to the first trigger condition, wherein the second amount is different than the first amount, wherein modifying the first volume limit causes the first volume levels that exceed the modified first volume limit to be reduced to adjusted first volume levels at or below the modified first volume limit, and wherein modifying the second volume limit causes the second volume levels that exceed the modified second volume limit to be reduced to adjusted second volume levels at or below the modified second volume limit; and
reverting the modified first and second volume limits to the respective first and second volume limits in response to an occurrence of a second trigger condition.

13. The tangible, non-transitory computer-readable medium of claim 12, wherein the first trigger condition comprises a voice command.

14. The tangible, non-transitory computer-readable medium of claim 13, wherein the first data is received via a microphone of the first playback device.

15. The tangible, non-transitory computer-readable medium of claim 12, wherein the received first data comprises an indication of a voice command.

16. The tangible, non-transitory computer-readable medium of claim 12, wherein the second trigger condition comprises a threshold period of time after the occurrence of the first trigger condition.

17. A method comprising:
- while a first zone and a second zone of a media playback system are playing back respective media, receiving, via a control system, first data indicating an occurrence of a first trigger condition, wherein the first zone comprises a first playback device and the second zone comprises a second playback device, wherein the first and second playback devices are set to respective first and second volume levels while playing back the respective media, and wherein the first and second playback devices have corresponding first and second volume limits;
- based on receiving the first data, modifying the first volume limit by a first amount that corresponds to the first trigger condition, and modifying the second volume limit by a second amount that corresponds to the first trigger condition, wherein the second amount is different than the first amount, wherein modifying the first volume limit causes the first volume levels that exceed the modified first volume limit to be reduced to adjusted first volume levels at or below the modified first volume limit, and wherein modifying the second volume limit causes the second volume levels that exceed the modified second volume limit to be reduced to adjusted second volume levels at or below the modified second volume limit; and
- reverting the modified first and second volume limits to the respective first and second volume limits in response to an occurrence of a second trigger condition.

18. The method of claim 17, wherein the first trigger condition comprises a voice command.

19. The method of claim 18, wherein the first data is received via a microphone of the first playback device.

20. The method of claim 17, wherein the received first data comprises an indication of a voice command.

21. The method of claim 17, wherein the second trigger condition comprises a threshold period of time after the occurrence of the first trigger condition.

* * * * *